United States Patent
Munro

(10) Patent No.: US 9,517,950 B2
(45) Date of Patent: Dec. 13, 2016

(54) WATER PURIFICATION SYSTEMS AND METHODS

(71) Applicant: Kevin E. Munro, Auburn, WA (US)

(72) Inventor: Kevin E. Munro, Auburn, WA (US)

(*) Notice: Subject to any disclaimer, the term of this patent is extended or adjusted under 35 U.S.C. 154(b) by 472 days.

(21) Appl. No.: 14/025,705

(22) Filed: Sep. 12, 2013

(65) Prior Publication Data

US 2014/0076812 A1    Mar. 20, 2014

Related U.S. Application Data

(60) Provisional application No. 61/701,524, filed on Sep. 14, 2012.

(51) Int. Cl.
*B01D 61/10* (2006.01)
*C02F 1/44* (2006.01)
*C02F 1/14* (2006.01)
*C02F 103/08* (2006.01)

(52) U.S. Cl.
CPC ............... *C02F 1/441* (2013.01); *B01D 61/10* (2013.01); *C02F 1/14* (2013.01); *B01D 2313/365* (2013.01); *C02F 2103/08* (2013.01); *C02F 2201/009* (2013.01)

(58) Field of Classification Search
None
See application file for complete search history.

(56) References Cited

U.S. PATENT DOCUMENTS

2011/0198208 A1* 8/2011 Olwig .................... C02F 1/048
                                                                    203/10
2011/0203573 A1* 8/2011 Hollis ........................ F24J 2/07
                                                                    126/595

OTHER PUBLICATIONS

Solacity, PDF, 2009.*
Spectra Aquifer Expedition. Datasheet [online]. Spectra Watermakers, Feb. 2011 [retrieved on Sep. 16, 2013]. Retrieved from the Internet: <URL: http://www.spectrawatermakers.com/documents/tmp/Aquifer_Expedition.pdf>.
Spectra Aquifer 150—200 Expedition. Owner's Manual [online]. Spectra Watermakers, Nov. 2011 [retrieved on Sep. 16, 2013]. Retrieved from the Internet: <URL: http://www.spectrawatermakers.com/documents/manuals/Aquifer_Expedition.pdf>.

* cited by examiner

*Primary Examiner* — Allison Fitzsimmons
(74) *Attorney, Agent, or Firm* — Kilpatrick Townsend & Stockton LLP

(57) ABSTRACT

Systems, components, and methods for water purification are described. In an example, a system may comprise an array of light-focusing elements, a heat exchanger device, a turbine generator, or other components and can be configured to use a source of light (e.g., sunlight) to filter water from a water source and to generate electricity. The electricity may be looped back into the system to further produce filtered water.

12 Claims, 3 Drawing Sheets

WATER PURIFICATION SYSTEMS AND METHODS

CROSS-REFERENCE TO RELATED APPLICATIONS

This application is a Non-Provisional of prior U.S. application Ser. No. 61/701,524, filed on Sep. 14, 2012, titled "Water Purification Systems and Methods," the contents of which is hereby incorporated in its entirety by reference.

BACKGROUND

Over two-thirds of the Earth is covered with salt water, and there is a relatively unlimited supply of solar energy. On the other hand, it is becoming clear that access to fresh water will be one of the biggest challenges for humanity in the twenty-first century. Unfortunately, in many areas of the world there is limited access to fresh water sources. In some instances, the lack of access can be attributed to a lack of electricity and power to filter water effectively. Poor areas, for example, typically cannot afford the costs required for installing infrastructure for electricity.

BRIEF SUMMARY

The present disclosure provides systems, apparatuses, and related methods for water purification. More specifically, the present disclosure provides systems, apparatuses, and methods for solar-powered water purification.

In one embodiment, the present disclosure includes a solar-powered water processing system. The system can include an array of light-focusing elements configured in an arrangement to produce a focused beam; a heat exchanger device located in the vicinity of the focused beam, the heat exchanger being coupled to a water source; and a turbine generator coupled to the heat exchanger and configured to produce electricity from steam produced from heating water in the heat exchanger device.

In one aspect, the present disclosure includes a system including a reverse osmosis filter system coupled to the heat exchanger and a seawater intake. In another aspect, the reverse osmosis filter system is configured to be powered by the electricity produced by the turbine generator. In yet another aspect, the electricity from the turbine generator is processed by an electrical distribution panel that is coupled to the reverse osmosis filter. In yet another aspect, the electrical distribution panel is coupled to a battery. In yet another aspect, a freshwater reserve source is coupled to the heat exchanger. In yet another aspect, the system includes a salt bath coupled to the reverse osmosis filter system such that brine from the filter system is directed into the salt bath. In yet another aspect, the system includes a pressure relief device coupled to the turbine generator, the pressure relief device further coupled to a condenser. In yet another aspect, the light-focusing elements comprise at least one Fresnel lens. In yet another aspect, the array of light-focusing elements is arranged in a dome shape. In yet another aspect, the heat exchanger comprises a plurality of pipes in parallel so as to absorb light from the focused beam of the array of light-focusing elements.

In another embodiment, the present disclosure includes a method of processing salt water with a solar-powered water processing system. The method can include collecting sunlight with an array of light-focusing elements configured in an arrangement to produce a focused beam; heating water in a heat exchanger device located in the vicinity of the focused beam, the heat exchanger being coupled to a water source; and using a turbine generator to generate electricity from steam produced by heating water in the heat exchanger, the turbine generator being coupled to the heat exchanger.

In one aspect, the present disclosure includes a method for, among other things, transferring the electricity to an electrical distribution panel coupled to a reverse osmosis filter system. In another aspect, the method includes using the electricity to power the reverse osmosis filter system. In yet another aspect, the method includes collecting potable water from the reverse osmosis filter system. In yet another aspect, the method includes collecting brine from the reverse osmosis filter system into a salt bath. In yet another aspect, the method includes heating the salt bath by irradiation with sunlight collected with an array of light-focusing elements configured in an arrangement to direct light towards a focal point positioned in the salt bath. In yet another aspect, the method includes heating the salt bath to greater than 800° C. In yet another aspect, the method includes generating steam from water in the salt bath and using the steam to generate electricity with the turbine generator. In yet another aspect, the method includes using an array of light-focusing elements that is arranged in a dome shape.

For a fuller understanding of the nature and advantages of the present disclosure, reference should be had to the ensuing detailed description taken in conjunction with the accompanying drawings/figures. The drawings/figures represent embodiments of the present disclosure by way of illustration. Features of the present disclosure are capable of modification in various respects without departing from the general scope. Accordingly, the drawings/figures and description of these embodiments are illustrative in nature, and are not restrictive.

DETAILED DESCRIPTION

The present disclosure provides systems, apparatuses, and related methods for water purification. More specifically, the present disclosure provides systems, apparatuses, and methods for solar-powered water purification.

There is a need for an eco-friendly, durable and inexpensive solution to purify water, e.g., seawater, such as by using solar energy. Moreover, there is a need for such systems to produce electricity for utility and emergency use. The present disclosure provides these needs and more.

In some aspects, the present disclosure provides improved capabilities for increasing flexibility in providing fresh water and electricity to areas that lack access to clean water and transmission grids. For example, the present disclosure can be implemented to meet challenges of granting access for rural areas that do not have steady sources of water, or areas that are near seawater but do not have access to fresh water. The present disclosure describes, among other things, utilizing simple, relatively inexpensive components to build water purification systems and electricity generation systems that can be readily used to help poorer areas around the world that are without power and fresh water.

Figure 1:
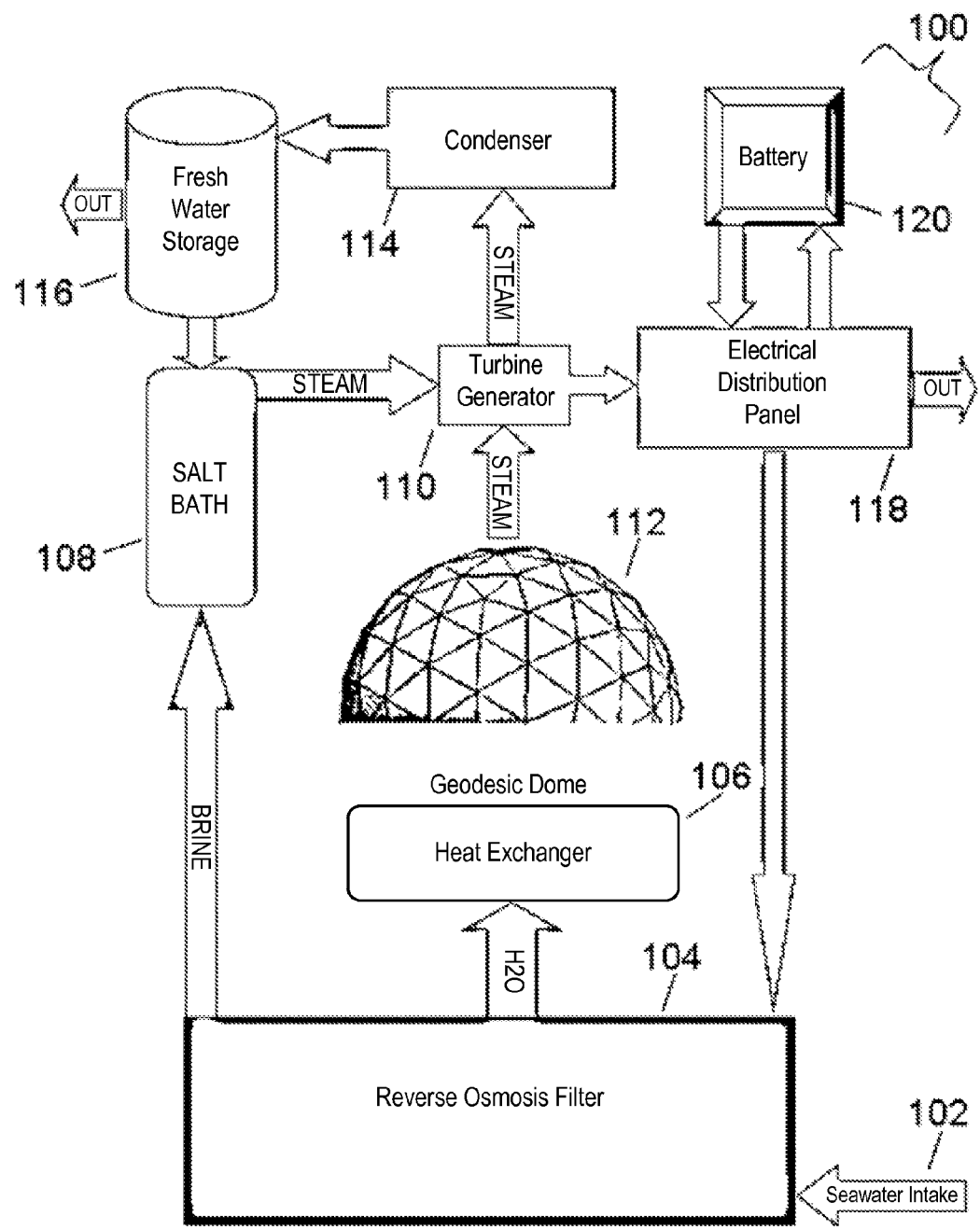
FIG. 1 provides an illustrative example of a system for water purification, in accordance with an embodiment of the present disclosure.

FIG. 1 provides a generalized schematic of an example water filtration system 100 of the present disclosure. In this example arrangement, several different components can be integrated to produce a system 100 capable of filtering water and generating electricity. As shown, a seawater intake 102 can be coupled with a reverse osmosis filter 104, which can be coupled to a heat exchanger 106 and/or a salt bath 108. Filtered water from the reverse osmosis filter 104 can be provided to the heat exchanger 106, which can turn the water into steam upon heating the exchanger with focused sunlight. In addition, unfiltered brine solution from the filter 104 can be further coupled to a salt bath 108. Depending on the configuration, both the salt bath 108 and the heat exchanger 106 can be used, e.g., to produce steam that couples with a turbine generator 110 to produce electricity. Alternatively, steam from either the salt bath 108 and/or the heat exchanger 106 can be coupled to a condenser apparatus 114 that can be used to collect water for fresh water storage 116.

Heat for creating the steam can be provided in different ways. As shown in FIG. 1, the heat exchanger can be positioned such that sunlight is focused onto the heat exchanger by a geodesic dome of lenses 112, thereby heating the water and producing steam. Light focusing elements (e.g., Fresnel lenses) can be arranged in the shape of a geodesic dome 112 that produces a focused beam of sunlight. In some embodiments, the heat exchanger 106 can be positioned in the vicinity of the focal point and heated to create steam. As described above, the steam can then be directed to a turbine generator 110, which thereby produces electricity.

Electricity from the turbine generator 110 can be collected in a variety of ways. As shown, an electrical distribution panel 118 can collect and distribute the generated electricity. In particular, the present disclosure provides a system that is capable of regenerating electricity to power the reverse osmosis filter 104 such that once the process of electricity production begins, the system will produce electricity continuously so as to allow for continuous water purification. A battery or battery cell 120 can be further coupled to the distribution panel 118 and, in some examples, can be used to store electricity produced by the system and/or provide electricity to get the system started. As will be described below, a wide variety of components and arrangements are envisioned for the present disclosure.

Figure 2:
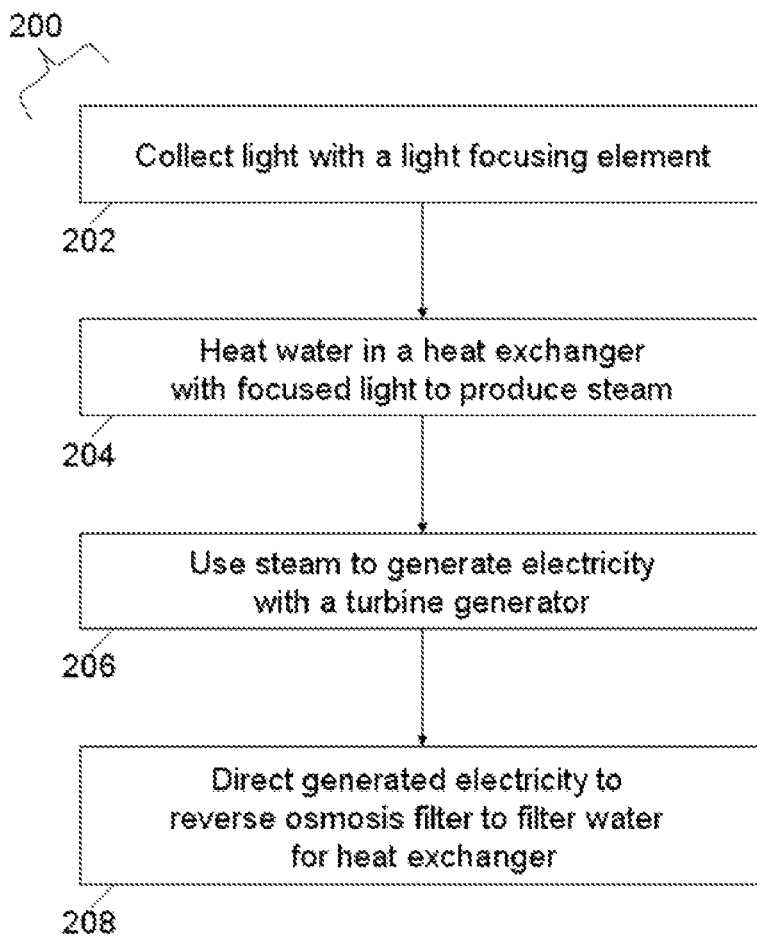
FIG. 2 shows an illustrative example of a method for water purification, in accordance with an embodiment of the present disclosure.

FIG. 2 provides a generalized schematic or flow chart of an example method 200 of the present disclosure. As shown in step 202, light (e.g., sunlight) can be collected with a light focusing element (e.g., in an array of light focusing elements). In step 204, a heat exchanger can be used to heat water to produce steam, in which the heat exchanger is positioned in the vicinity of the focal point of the light focusing element. In step 206, steam from the heat exchanger can be coupled to a turbine generator that may produce electricity from the steam. In step 208, electricity form the turbine generator can be directed in a loop back to the reverse osmosis filter to further provide filtered water to the heat exchanger. In view of the system in FIG. 1, the methods of the present disclosure can further include, in some examples, directing a brine solution to a salt bath that can then be used to produce steam for electricity generation. Furthermore, the methods of the present disclosure can include directing steam from the turbine generator and/or heat exchanger into a condenser to produce water that can be directed into a fresh water storage system. In some embodiments, the fresh water can be directed back into the salt bath or output for other uses, e.g., as drinking water.

The systems, apparatuses, and methods for water purification can include light focusing elements that can, e.g., be designed to collect light from a source (e.g., sunlight from the sun) and produce a focused beam of light. The light focusing elements for the present disclosure can include a variety of element types that focus light. For example, a light focusing element can include lenses of different shapes and sizes, such as Fresnel lenses, plano-convex lenses, plano-concave lenses, biconcave lenses, positive and/or negative meniscus lenses, cylindrical lenses, and/or spherical lenses. One embodiment includes using Fresnel lenses that can be inexpensive and durable, such as the transparent polycarbonate plastic lenses often used in overhead projectors, projection televisions, and/or hand-held sheet magnifying glasses. A Fresnel lens can also be designed to have a specific focal point length and distance to apex for particular applications. One of ordinary skill in the art will appreciate the myriad types of lenses available for focusing light.

In addition to the varied types of lenses, the light focusing elements can also be arranged in variety of configurations. For example, a plurality of light focusing elements can be arranged in an array in which the elements (e.g., Fresnel lenses) are positioned next to one another so as to collect and focus light towards a focal point. In some embodiments, the array of light focusing elements can be oriented so as to focus light towards one focal point. In certain embodiments, the array of light focusing elements (e.g., Fresnel lenses) can be arranged to create multiple focal points. In some embodiments, the one or more focal points may change position overtime due to, e.g., a changing position of the sun over the day and/or by movement of the lenses by hand or other means, such as a motorized system. In one embodiment, the Fresnel lenses can be arranged, for example, in the shape of a geodesic dome. A spherical shape may be efficient because it encloses the most volume with the least surface. Consequently, for a low cost, efficient water purification system of the present disclosure, any dome that may be a portion of a sphere may have the least surface through which to lose heat or intercept potentially damaging winds may be utilized. The geodesic dome can use a pattern of self-embracing triangles that give structural strength advantages, with a low amount of material used. As used herein, a "geodesic" line on a sphere may include the shortest distance between any two points. Local loads can be distributed uniformly throughout the geodesic dome, thereby utilizing the entire structure. And, in contrast to conventional building, geodesic domes may get stronger, lighter, and cheaper per unit volume as their size increases.

Figure 3:
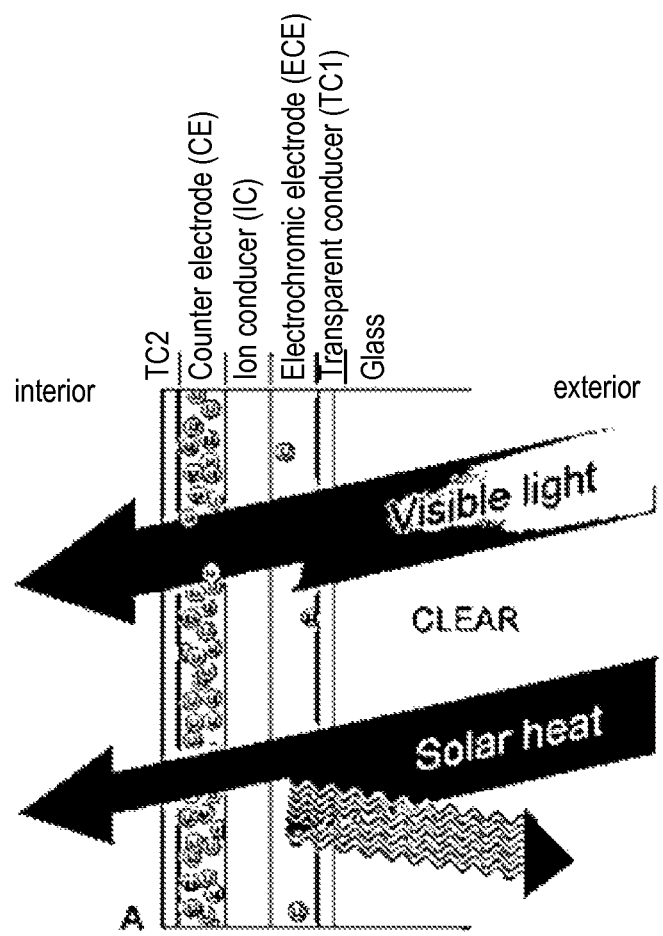
FIG. 3 depicts an example of an electrochromic layer on a light focusing element, in accordance with an embodiment of the present disclosure.
Figure 3:
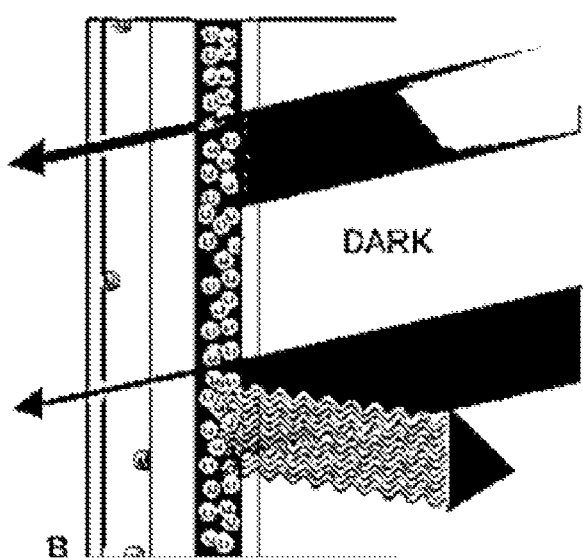

In yet other embodiments, the light focusing elements can be configured to modulate the amount of light passing through the element. For example, layers can be coated on the lenses (e.g., Fresnel lenses) that can change the transmission properties due to an input, e.g., an electrical input. As shown in FIG. 3, electrochromic film layers can be coated on the lenses and used to modify the amount of light transmission. The electrochromic film layers may include, for example, a first transparent conductor, an electrochromic electrode, an ion conductor, a counter electrode, a second transparent conductor, and/or other layers, while the lens may be made of materials such as glass or other materials. When low voltage is applied to these layers in their "clear" state, the layers may darken due to lithium ions and associated electrons transferring from the counter electrode to the electrochromic electrode layer. Reversing the voltage polarity may cause the ions and associated electrons to return the original layer, the counter electrode, thereby removing the tint on the surface of the light focusing element. This solid state electrochromic reaction can be, e.g., controlled through a low voltage DC power supply. Notably, when the coating darkens, sunlight and heat from the sun can be absorbed and radiated from the surface of the light focusing element. Such properties can be useful, for example, in controlling the amount of heat produced to form steam in the heat exchanger.

The systems, apparatuses, and methods described herein can further include a heat exchanger. Generally, a heat exchanger can be used to transfer heat energy to water and create steam. In certain embodiments, the heat exchangers described herein can be coupled to a water filter or intake and then be heated to produce steam that can be directed to a turbine generator to create electricity. A variety of heat exchangers can be used. For example, the heat exchangers can be made of a variety of materials and have different configurations. In some aspects, selection of materials for the heat exchanger can depend, e.g., on the desired thermal conductivity, melting points, and/or resistance to seawater corrosion. Suitable materials include, but are not limited to, copper, brasses, stainless steel, and aluminum bronzes. Portions of a heat exchanger may be composed of one material, while another portion of the heat exchanger is composed of a different material. In one embodiment, the heat exchanger can be copper, which may provide excellent conductive properties for heat and electricity while also having a high melting point (1981.4° F.) to withstand focused sun radiation. Other metals and/or alloys such as carbon steel can similarly be used. Moreover, the tubing in the heat exchanger can be, e.g., coiled, straight, and/or bent. The configuration of the tubing can dependent in some instances on maximizing heat transfer between heat generated from sunlight to heat used to evaporate the water in the tubing. In some embodiments, tubes can be arranged side-by-side in a parallel manner and coupled together with known tube couplings. The heat exchanger may also resemble a flattened boiler.

Furthermore, the positioning of the heat exchanger and the focused light can be optimized to effectively produce steam in a variety of conditions. For example, heat exchangers can be used that have different sizes and configurations, which can affect absorption of heat from the light and therefore affect rates of steam production with the exchanger. In addition, the amount of sunlight radiating on the heat exchanger can change over time, e.g., due to the changing position of the sun during the day, clouds, or other conditional changes. As a result, the relative position of the focused light and the heat exchanger can be modified to optimize steam production. In some embodiments, the heat exchanger may be positioned at the focal point of the light-focusing elements. Alternatively, the heat exchanger may be positioned away from the focal point, but still in the beam of focused light. These positional arrangements are intended to be "in the vicinity of the focal point," and the relative positioning can be tailored to optimize heating of the exchanger. In certain aspects, the heat exchanger may match or be a reflection of the arc of the dome array so that heat transfer can be maximized. For example, the focal points from the array of light focusing elements may trace a particular path over the day. The heat exchanger can be shaped so as to maximize overlap with the location of the focal points over the day. Given that the sun's path changes throughout the year, the shape, configuration, or positional location can be readily optimized to facilitate maximum overlap with the focusing sunlight. For example, different heat exchangers can be used at different times during the year or, alternatively, the configuration can be modified by rearranging the heat exchanger tubing. In some embodiments, the temperatures on the heat exchanger at the focal point will be proportional to the size of the lens/array and may vary for steam generation requirements based on the internal pressure of the heat exchanger.

As provided herein, the present disclosure further includes a turbine for creating electricity. As described above, for example, a steam turbine can couple to various steam generators (e.g., the heat exchanger and/or salt bath). The turbines suitable for use with the present disclosure can include, e.g., steam turbines that are well known in the art. The turbines can be selected so as to incorporate effectively with other components of the systems. For example, the amount of steam being produced in the heat exchanger may drive the turbine used for a particular system. In some instances, systems used in areas of less sunlight may not generate the level of steam produced by a system in more sunlight. As such, steam turbines can be selected to optimally integrate with the heat exchanger and the conditions of sunlight.

In some embodiments, the steam turbine can be coupled to a condenser system for turning the steam to water that can, e.g., be used for freshwater consumption. Some available steam turbine generators have an integrated condenser. Condensers that couple to the steam turbine can be made a variety of materials, such as glass or metal. In addition, condensers can be configured to collect condensed steam from the steam turbine to produce a freshwater storage supply that can be used for a variety of applications. In some embodiments, the same or a different condenser system can be coupled with a turbine that collects steam produced by heating a salt bath.

To provide water to the system, the present disclosure further includes a filter system. A variety of filter systems can be used. For example, depending on the salinity of the water and location of the application, cartridge, sand or diatomaceous earth filters may be used in conjunction with a reverse osmosis (R.O.) filter. The total number of membranes and pressure vessels used and their respective arrangement (e.g., a R.O. array) can depend on permeate flow and applied pressure, which can depend on salinity and temperature. In some embodiments, before entering seawater reverse osmosis membranes, clarified seawater can be pressurized by a high pressure pump typically between 55 and 85 bars, depending on the temperature and the salinity of the water. In one embodiment, a reverse osmosis filter system may be coupled with a water source, e.g., that is not filtered or purified such as seawater and/or river water. Unfiltered water can be provided through a variety of means. For example, hoses can be placed in the ocean or a river directly and used to pump water into the system. Alternatively, if the system is used where seawater and/or river water is not directly accessible, then drums or other containers holding water aloft can be coupled to the system to provide a gravity feed for filtering water. In some embodiments, the present disclosure can further include integrating more than one filter system. For example, different types of filter systems can be used in tandem to efficiently provide water to the heat exchanger. In some instances, rain water can be collected and filtered with a gravity-based filter system prior to introduction into the heat exchanger. Electricity generated by the system can then be used to drive a different filter system, such as a R.O. filter system.

An electrical distribution panel can be further included in the present disclosure. Electrical distribution panels are generally well known in the art. However, as provided by the present disclosure, an electrical distribution panel can be coupled in the system so as to direct electricity from the turbine generator back into the system to power, e.g., the intake R.O. filter system. The self-propagating loop of electricity may provide particular advantages that may allow for continuous operation of the purification system without requiring electricity from an external source. In some desalination applications, electricity may be used for the intake pump and reverse osmosis filter. This system, which may run on the energy from sunlight, may be self-sustaining and may not require outside electricity. In one embodiment, one square meter of sunlight can be used to generate about 1 kWh of electricity, and with 40% recovery, about 125 m$^3$/h of filtered water can be generated by 0.08 kWh at peak.

In some embodiments, a battery system can be coupled to the system, e.g., to the electrical distribution panel so as to provide some external electricity, if needed. For example, electricity of the battery system can be used to start the system initially, but once the system starts, the system can internally produce the electricity looped among the heat exchanger, turbine generator, electrical distribution panel, and the reverse osmosis filter (as shown, e.g., in FIG. 1). Additionally, the battery system can be rechargeable so as to take some of the electricity produced from the system during operation.

In addition to heating filtered water in a heat exchanger device, the present disclosure further includes generating steam from molten salt baths. The salt baths can be generated by heating a concentrated brine solution produced from a filter, e.g., the reverse osmosis filter. Heating the salt bath can be conducted by injecting steam through pipes within the salt bath to raise the internal temperature. In some embodiments, the salt bath will be heated to a temperature greater than 800° C. The generated steam can be from the same heat exchanger array as used in heating filtered water from the reverse osmosis filter. Alternatively, a second dedicated array of light focusing elements can be used to create steam heat exclusively for the salt bath. Upon heating of the salt bath, steam can be re-generated by injecting water back through the pipes within the salt bath and coupled to a turbine generator, which may generate electricity at night or to restart the system (as shown, e.g., in FIG. 1).

In another aspect, the present disclosure can further include a condenser system. In some embodiments, the condenser can be coupled to the turbine generator such that some or all of the steam may be sent to the condenser, which may condense the steam to water and may then direct the water into a fresh water storage device. In certain embodiments, the condenser can be coupled to a heat exchanger directly such that some or all of the steam is directed to the condenser. If only some of the steam is provided to the condenser, then the left over steam can be directed to the turbine generator to generate electricity depending on whether water is needed more than electricity.

It is understood that the examples and embodiments described herein are for illustrative purposes only and that various modifications or changes in light thereof may be suggested to persons skilled in the art and are included within the spirit and purview of this application and scope of the appended claims. Numerous different combinations of embodiments described herein are possible, and such combinations are considered part of the present disclosure. In addition, all features discussed in connection with any one embodiment herein can be readily adapted for use in other embodiments herein. The use of different terms or reference numerals for similar features in different embodiments does not necessarily imply differences other than those which may be expressly set forth. Accordingly, the present disclosure is intended to be described solely by reference to the appended claims, and not limited to the preferred embodiments disclosed herein.

What is claimed is:

1. A solar-powered water processing system, comprising:
   a reverse osmosis filter coupled with a water intake and configured to receive water from a water source through the water intake and to produce filtered water by filtering the water;
   an array of light-focusing elements configured in an arrangement to produce light in a focused beam, wherein the array of light-focusing elements comprises lenses coated with electrochromic film layers, each of the lenses coated with an electrochromic film layer, wherein the electrochromic film layers are configured to controllably darken;
   a heat exchanger device located in the vicinity of the focused beam, the heat exchanger being coupled with the reverse osmosis filter to receive a portion of the filtered water and configured to heat the portion of the filtered water by using the light in the focused beam to produce steam;
   a turbine generator coupled with the heat exchanger and configured to produce electricity from the steam;
   a battery configured to store a portion of the electricity; and
   an electrical distribution panel coupled with the turbine generator and configured to distribute the electricity to a plurality of elements, the plurality of elements comprising the battery and the reverse osmosis filter, wherein, based on the electricity being produced, the electrical distribution panel is configured to start powering the reverse osmosis filter from the turbine generator.

2. The system of claim 1, further comprising the water intake, and wherein the water intake is a seawater intake.

3. The system of claim 1, wherein the water source comprises a freshwater reserve source.

4. The system of claim 1, further comprising a salt bath coupled with the reserve osmosis filter system such that brine from the osmosis filter system is directed into the salt bath.

5. The system of claim 1, further comprising a pressure relief device coupled with the turbine generator, the pressure relief device further coupled with a condenser.

6. The system of claim 1, wherein the light-focusing elements comprise at least one Fresnel lens.

7. The system of claim 1, wherein the array of light-focusing elements is arranged in a dome shape.

8. The system of claim 1, wherein the heat exchanger comprises a plurality of pipes in parallel so as to absorb light from the focused beam of the array of light-focusing elements.

9. The system of claim 1, further comprising a condenser and a fresh water storage, wherein the condenser is configured to receive a portion of the steam after the steam having being used to produce the electricity and to condense the portion of the steam to produce fresh water, and wherein the fresh water storage is configured to store the produced fresh water.

10. The system of claim 1, wherein the reverse osmosis filter is further configured to produce a brine from the water received from the water source through the water intake.

11. The system of claim 1, wherein the array of light-focusing elements comprises a plurality of lenses each of the plurality of lenses coated with electrochromic film layers, wherein the electrochromic film layers are configured to controllably darken.

12. The system of claim 1, wherein the array of light-focusing elements comprises a plurality of lenses arranged in a geodesic dome.

\* \* \* \* \*